United States Patent [19]
Hu et al.

[11] Patent Number: 5,209,849
[45] Date of Patent: May 11, 1993

[54] HYDROPHILIC MICROPOROUS POLYOLEFIN MEMBRANE

[75] Inventors: Hopin Hu, Ann Arbor; Zhihua Cai, Ypsilanti, both of Mich.

[73] Assignee: Gelman Sciences Inc., Ann Arbor, Mich.

[21] Appl. No.: 874,480

[22] Filed: Apr. 24, 1992

[51] Int. Cl.$^5$ .............................................. B01D 71/78
[52] U.S. Cl. ................................. 210/490; 210/500.35
[58] Field of Search ............... 427/245, 246, 44, 53.1; 264/22; 210/490, 500.35

[56] References Cited

U.S. PATENT DOCUMENTS 4,256,782  3/1981  Tazuke et al. ...................... 427/53.1
4,288,467  9/1981  Machi et al. ........................... 427/44

*Primary Examiner*—Frank Spear
*Attorney, Agent, or Firm*—Krass & Young

[57] ABSTRACT

A hydrophilic microporous membrane, is provided comprising a hydrophobic membrane substrate exemplified by a polyolefin or partially fluorinated polyolefin membrane. A process is also provided for preparing a hydrophilic membrane by grafting a water soluble polymer to the hydrophobic membrane substrate surface by irradiation means, e.g., ultraviolet irradiation. The invention further concerns a method for making the membrane and process means for filtering a fluid through such membrane.

14 Claims, No Drawings

HYDROPHILIC MICROPOROUS POLYOLEFIN MEMBRANE

FIELD OF THE INVENTION

This invention relates to a hydrophilic microporous membrane, comprising a hydrophobic membrane substrate exemplified by a polyolefin membrane or partially fluorinated polyolefin membrane. The invention also concerns a process for preparing a hydrophilic membrane by grafting a water soluble polymer to the hydrophobic membrane substrate surface by irradiation means, e.g., ultraviolet (i.e. UV) irradiation. The invention further concerns a method for making the membrane and process means for filtering a fluid through such membrane.

BACKGROUND OF THE INVENTION

The separation of particulates and macromolecules from a fluid by micro-and ultra-filtration using polymeric membranes has found numerous applications in the analytical, pharmaceutical, electronic, and food industries. Traditionally, porous membranes of cellulose derivatives have been utilized as hydrophilic membrane media for aqueous filtration. However, these membranes have poor chemical resistance, and are also lacking in thermal and gamma sterilizability, which limits their application in practical service.

To meet the requirements for chemical filtration, porous membranes such as polypropylene and polytetrafluoroethylene membranes were therefore developed. These membranes generally have excellent chemical and solvent resistance. However, one drawback associated with these membranes is their hydrophobicity. For practical aqueous filtration, these hydrophobic membranes must be either pre-wetted with a low surface tension liquid such as alcohols, prior to use, or pretreated with hydrophilic chemicals to render the membrane hydrophilic as described in U.S. Pat. Nos. 4,578,414; 4,501,785 and 4,113,912 prior to use. Upon use of these treated membranes, however, there is a risk that the wetting agents may be leached from the membrane by the solution being filtered. Such leaching in turn may result in contamination of the filtrate.

To impart permanent hydrophilicity to a hydrophobic porous membrane, a hydrophilic monomer can be chemically grafted to the hydrophobic membrane substrate by plasma treatment. The plasma polymerization is generally achieved by activating the membrane surface using argon or hydrogen plasma, followed by exposing the activated membrane to the vapor of free radical polymerizable monomers such as acrylic acid. Typical examples of plasma treatment of membrane can be found in U.S. Pat. No. 4,815,132 and Japanese Patents 59/045,528, 61/152,700 and 56/090,838. In practice, the plasma treatment may fail to produce uniform membrane hydrophilicity due to the low penetration of plasma gas and insufficient access of the hydrophilic monomer to the interior of membrane. Large scale use of the technique is not feasible because of the high vacuum requirement during the treatment.

An alternative to the plasma treatment is to utilize a radiation ray treatment which possesses a high penetrating force such as UV, electron beam or gamma ray treatment. However, the hydrophobic membrane will generally suffer from loss of mechanical strength and other desirable membrane properties after exposure to such high energy irradiation. In addition, these high energy irradiation processes entail unsolved problems regarding oxygen sensitivity and mass production feasibility since the active free-radical sites on the membrane substrate generated by the radiation ray are very susceptible to oxygen scavenge.

SUMMARY OF THE INVENTION

The present invention concerns a hydrophilic microporous membrane comprising a hydrophobic polyolefin membrane substrate and a thin coating of hydrophilic polymer permanently attached to the membrane substrate, and also concerns process means for preparing the same. The hydrophobic membrane substrate can comprise either a polypropylene membrane or a partially fluorinated polyolefin membrane which preferably may be a polyvinylidene difluoride membrane. The hydrophobic membrane substrate is chemically modified by post-treatment with an ethyleneglycol oligomer end-capped with methacrylate groups via an irradiation process. The invention comprises a new free radical photografting process which is insensitive to the presence of oxygen, and the hydrophilic membrane so prepared retains the same chemical stability and low extractability as the untreated precursor, but with improved mechanical strength and low affinity to protein molecules. The hydrophilic microporous membranes of the invention are suitable for medical, genetic and biochemical research, and in the food, beverage (including wine and beer), cosmetics, biotechnology, pharmaceutical, and electronics industries.

DETAILED DESCRIPTION OF THE INVENTION

The present invention in one preferred aspect concerns a hydrophilic microporous composite membrane structure comprising polyolefin, preferably polypropylene or a partially fluorinated polyolefin membrane such as polyvinylidene difluoride. The membrane structure comprises a microporous membrane substrate or precursor membrane having external surfaces and having pores with internal pore surfaces. The membrane structure further comprises a second polymer which is a water soluble hydrophilic polymer comprising polyethylene glycol diacrylate co-extensively applied to said surfaces in a thin liquid coating that is permanently grafted in solid state form onto the surfaces of the precursor membrane so that the thus grafted membrane structure is hydrophilic, retains its microporosity and is water wettable, and non-leachable. The hydrophilic polymer comprises polyethylene glycol di(lower alkyl)acrylate which preferably is polyethylene glycol dimethacrylate. The hydrophilic polymer is permanently grafted onto the surfaces of the Precursor membrane by a radiation ray process, preferably a UV process. Traditionally, microporous membranes are defined as thin walled structures having spongy morphologies with a narrow pore size distribution. The mean pore size for microporous membranes may range between 0.01 $\mu$m and 10 $\mu$m or larger.

The hydrophilic membranes of the present invention are prepared by grafting the mentioned water soluble polymer to the hydrophobic membrane substrate via a radiation ray process, preferably a UV process. The extent of grafting is such that the surface of pores of membrane substrate is completely covered with a thin layer of the water soluble polymer which does not affect the membrane pore size as compared to the untreated precursor. The grafting is suitably accomplished by contacting the porous membrane substrate with a photografting solution of the mentioned second polymer and a photoinitiator in ethylene glycol, and exposing the second polymer to radiation ray treatment to graft the second polymer in situ over the entire surfaces of the substrate while avoiding plugging of the substrate pores. The water soluble polymer as mentioned herein imparts the hydrophilicity, the low protein binding characteristic, and other desirable properties to the membrane. A preferred water soluble polymer is polyethylene glycol-dimethacrylate (available from Polysciences, Inc., Warrington, Pa.) having a nominal molecular weight of 400 and the formula I:

where n is an integer expressing the polymer chain length. Other polymers such as polyethyleneglycol diacrylate having chemical properties similar to the preferred polymer can also be used.

Photoinitiators are required to achieve the chemical grafting of the water soluble polymer to the hydrophobic membrane substrate under UV conditions. The preferred photoinitiators are hydroxyalkylphenones having the formula II:

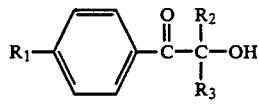

where $R_1$ is hydrogen, a $C_1-C_4$ alkyl group, a $C_1-C_4$ alkoxy, or a halogen; $R_2$ and $R_3$ are alkyl or alkoxy groups. An especially preferred photoinitiator is 1-hydroxy-1,1-methyl acetophenone available commercially as Darocur 1173 (EM Industries, Inc., Hawthorne, N.Y.) having the formula III:

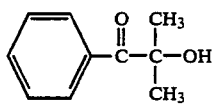

In principle, any inert solvent capable of dissolving both the water soluble polymer and the photoinitiator which will not affect the membrane substrate under radiation conditions should be suitable for grafting polymerization. Surprisingly, in the present invention only ethylene glycol was found to be a unique, efficient solvent for the process of UV grafting polyethylene glycoldimethacrylate to the hydrophobic polypropylene membrane substrate. Methanol, ethanol, n-propanol, acetone, 2-butanone, and the like used in place of ethylene glycol failed to provide effective grafting as evidenced by the complete hydrophobicity of the resulting treated membranes. Solvents having the similar structure to ethylene glycol such as propylene glycol and other ethylene glycol oligomers were also found to be ineffective for grafting. Apparently, ethylene glycol plays a role more than as a solvent during the UV grafting of polyethylene glycoldimethacrylate to the hydrophobic membrane substrate. It was speculated that the specific molecular and electronic structure of ethyleneglycol would stabilize the free radicals generated on the membrane substrate or the water soluble polymer, and thus lower the oxygen scavenging reactivity. While the above is a plausible explanation for the unique property of ethylene glycol in the present invention, it has not been rigorously proven so that the invention is not limited to this or any other theory.

Prior to the UV process by a first preferred embodiment, the hydrophobic membrane is pre-wetted in a low surface tension liquid such as methanol or acetone, followed by soaking the membrane in a solution containing the photoinitiator, water soluble polymer, and ethylene glycol. The latter solution is sometimes referred to herein as the photografting solution. Alternatively, by a second preferred process embodiment, the hydrophobic membrane substrate is directly soaked in the photografting solution in which a sufficient amount of low surface tension liquid such as acetone or methanol is added to make the hydrophobic membrane completely wet in the solution. The second process is especially preferred in the present invention.

The water soluble polymer in the photografting solution is present generally in the amount of about 3% to 20%, preferably being from 7% to 12% based on the total weight of the photografting solution. If the water soluble polymer concentration is significantly higher than the upper limit of the preferred concentration range, the UV treated membrane would have a low permeability and high extractability due to the overcoating of water soluble polymer. Conversely, if the water soluble polymer concentration is much lower than the lower limit of the preferred concentration range, the Uv treated membrane is not readily wettable in water due to an insufficient amount of water soluble polymer grafted to the membrane substrate.

The photoinitiator concentration is generally in the range of 0.01% to 1.0%, preferably being from 0.05% to 0.2% based on the total weight of the photografting solution. When the photoinitiator concentration is beyond this range, the UV treated membrane would have either high extractability or would lack instant water wettability.

The ethylene glycol is normally used in a concentration range of 45% to 75%, preferably in the range of 60% to 70% based on the total weight of the photografting solution. If the ethylene glycol concentration is too low, the UV treated membrane will not be readily wettable in water. There is virtually no upper limit for the ethylene glycol concentration as far as membrane hydrophilicity is concerned. However, the highest ethylene glycol concentration achievable is limited by the maximum solubility of the water soluble polymer, the photoinitiator, and the low surface tension liquid in the photografting solution. The concentration of the low surface tension liquid in the photografting solution required to completely wet out the hydrophobic membrane substrate is approximately 15% to 25% preferably 20%.

In this invention, the photografting solution saturated with air is directly used to post-treat the hydrophobic membrane substrate without having to deplete oxygen from the solution. Ordinarily, the presence of oxygen in the solution would detrimentally affect the grafting efficiency during the irradiation process. However, such detrimental effect typically does not occur in the present process.

The process of preparing the hydrophilic membrane from a hydrophobic membrane substrate in a preferred embodiment using Uv treatment includes the following steps:
1. Soaking the hydrophobic membrane in the photografting solution for a few seconds at ambient temperature to wet out the membrane completely.
2. Removing the membrane from the photografting solution, wiping off the excess solution by "squeegee" action using wiper bars, and placing on a 3 mil polyethylene terephthalate non-permeable film (i.e., MYLAR ® film available from E.I. DuPont, Wilmington, Del.).
3. Exposing the membrane in a UV chamber filled with nitrogen or other inert gas for about 10 to 50 seconds at a Uv intensity of about 140 mW/cm².
4. Soaking the UV treated membrane in water soluble solvents such as methanol for 2 to 4 days to remove decomposed products of the photoinitiator, any unreacted polymers and other undesirable materials; and
5. Finally leaching the membrane in deionized water at 190° F. for 40 minutes and drying the washed membrane in an oven at 140° F. for 20 minutes.

The UV treated membranes of the invention exhibit excellent chemical stability toward various chemicals such as ketones, esters, ethers, alkanes, alcohols, 6M sodium hydroxide, and 12M hydrochloric acid at ambient temperature for 3 days, evidenced by the invariance of membrane hydrophilicity and other characteristics. The stability of such treated membranes was further confirmed by autoclaving the membranes at 250° F. for 35 minutes and by alcohol Soxhlet extraction for 16 hours. These results clearly indicate that the membranes are indeed hydrolytically and chemically stable.

In addition to their chemical compatibility, the Uv treated membranes have an extractability as low as that of the untreated precursor based on HPLC analysis. Also, they have better mechanical strength than the untreated precursor. Moreover, the treated membranes possess a much lower protein binding characteristic as compared to the untreated precursor, due to the low protein affinity property of the polyethylene glycol moiety attached to the membrane. Therefore, all of these unique properties make the UV treated polyolefin membranes disclosed in this invention ideal for pharmaceutical, biological and other applications.

GENERAL TESTING METHODS

Following are descriptions of tests performed in illustrative examples which follow describing preferred embodiments of the invention.

Water Bubble Point

This common test for microporous membranes is a measurement of the largest pores in a membrane. It consists of expelling water from a water wetted membrane by air pressure. Pore size and the pressure necessary to remove water from that pore are related by:

$$D = \frac{B \gamma \cos \theta}{P}$$

where P is the pressure, $\theta$ is the liquid-solid contact angle between the membrane material and water, $\gamma$ is the liquid-air surface tension, D is pore diameter, and B is constant.

Water Flow Rate

Water flow rate is the flow rate of water passing through the membrane of given dimension, and commonly expressed in mL/Min/cm² of water at a given pressure.

Water Wettability

The wettability of a microporous membrane was determined by placing a 47 mm membrane disc evenly on the surface of a liquid at ambient temperature. The data are expressed as the time (seconds) taken for the entire disc to become co-extensively and completely wet.

The invention and the best mode of practicing the same are illustrated by the following examples.

GENERAL UV-TREATMENT PROCESS

The preferred procedures of preparing a hydrophilic microporous membrane from a hydrophobic polyolefin membrane using UV treatment are the following:
1. The hydrophobic membrane is soaked in the photografting solution containing polyethylene glycol-dimethacrylate, Darocur 1173, ethylene glycol, and acetone of appropriate concentration for a few seconds at ambient temperature to wet out the membrane completely.
2. The membrane is removed from the photografting solution, the excess solution is wiped off by "squeegee" action using wiper bars, and then the membrane is placed for support on a polyethylene terephthalate non-permeable film.
3. The supported membrane is exposed to UV light at an intensity of about 130 mW/cm² to 150 mW/cm² for about 10 to 50 seconds in a chamber filled with nitrogen or other inert gas.
4. After the UV treatment, the membrane is separated from the polyethylene terephthalate film, and soaked in methanol or the like for 2 to 4 days.
5. The membrane is removed from the methanol and then leached in deionized water at 190° F. for 40 minutes and finally dried in an oven at 60° C. for 20 minutes.

ILLUSTRATIVE EXAMPLES

EXAMPLE 1-8

A 0.2 μm hydrophobic polypropylene membrane (available as Metricel ® membrane from Gelman Sciences Inc., Ann Arbor, Mich.) was used as the membrane substrate. Eight photografting solutions containing various concentrations of polyethylene glycol-dimethacrylate (molecular weight of 400), Darocur 1173, were used with the composition shown in Table I. These solutions were degassed with nitrogen gas for about 20 minutes

TABLE I

| Example | EG[a] (%) | PEG-DM[b] (%) | Darocur 1173 (%) | Acetone (%) |
|---|---|---|---|---|
| 1 | 64 | 15 | 0.3 | 20.7 |
| 2 | 64 | 12 | 0.3 | 23.7 |
| 3 | 64 | 9 | 0.3 | 26.7 |
| 4 | 64 | 5 | 0.3 | 30.7 |
| 5 | 64 | 12 | 1.0 | 23.0 |
| 6 | 64 | 12 | 0.2 | 23.8 |
| 7 | 64 | 12 | 0.1 | 23.9 |

TABLE I-continued

| Example | EG[a] (%) | PEG-DM[b] (%) | Darocur 1173 (%) | Acetone (%) |
|---|---|---|---|---|
| 8 | 64 | 12 | 0.0 | 24.0 |

[a]EG represents "ethylene glycol".
[b]PEG-DM represents polyethylene glycol-dimethacrylate 400.

Experimentally, the membranes (5 cm×20 cm) were soaked in photografting solution for 5 to 30 seconds. After the excess solutions were removed, the membranes were placed on a polyethylene terephthalate film (3 mil in thickness) and subjected to UV light. The membranes were then separated from the plastic film and soaked in methanol for 3 days at ambient temperature and washed with 190° F. deionized water for 30 minutes, and finally dried at 140° F. for 20 minutes.

The treated membranes were characterized for water wettability, water flow rate, burst strength, and water-isopropanol (60/40) bubble point. An untreated polypropylene membrane was used as control. The testing results are presented in Table II.

TABLE II

| Example | Water Wettability (sec) | Water Flow Rate at 10 psi (mL/Min/cm$^2$) | Water-Isopropanol Bubble Point (psi) | Burst Strength (psi) |
|---|---|---|---|---|
| 1 | Instant | 13.0 | 21 | 23 |
| 2 | Instant | 14.3 | 19 | 21 |
| 3 | Instant | 13.5 | 18 | 20 |
| 4 | 2 | 14.0 | 18 | 18 |
| 5 | Instant | 13.7 | 20 | 21 |
| 6 | Instant | 13.9 | 20 | 20 |
| 7 | Instant | 13.0 | 20 | 21 |
| 8 | 10 | 12.5 | 18 | 16 |
| Control | Hydrophobic | 16.0* | 18 | 13 |

*This hydrophobic polypropylene membrane was pre-wetted in ethanol prior to test for water flow rate.

Further tests were also conducted to examine UV-treated membrane stability. The membranes were autoclaved at 250° F. for 35 minutes and Soxhlet extracted with methanol, acetonitrile, and tetrahydrofuran for 14 hours. The results show that after such treatments the membranes still retained their integrity with respect to wettability, water flow rate, bubble point, and burst strength.

EXAMPLE 9

A 0.2 μm hydrophobic polypropylene membrane was treated in the same manner as described in Examples 1-8 except that a photografting solution containing 0.1% Darocur 1173, 12% polyethylene glycol-dimethacrylate of molecular weight of 400, 65% ethylene glycol, and 22.9% acetone was used. No nitrogen purge was applied to the photografting solution prior to use. Nevertheless, the UV-treated membrane was instantly wettable in water, and its wettability still remained unchanged after 14-hour isopropanol Soxhlet extraction and 35 minute autoclave at 250° F.

EXAMPLE 10-14

Five photografting solutions containing various amounts of ethylene glycol were used in a UV-treatment process of a polypropylene membrane as in Examples 1-8. The composition of each photografting solution is shown in Table III. The Uv-treatment was carried out in a manner similar to that disclosed in Example 1-8, and the results are outlined in Table IV.

TABLE III

| Example | EG[a] (%) | PEG-DM[b] (%) | Darocur 1173 (%) | Acetone (%) |
|---|---|---|---|---|
| 10 | 0 | 10 | 0.3 | 89.7 |
| 11 | 30 | 10 | 0.3 | 59.7 |
| 12 | 45 | 10 | 0.3 | 44.7 |
| 13 | 55 | 10 | 0.3 | 34.7 |
| 14 | 65 | 10 | 0.3 | 24.7 |

[a]EG represents ethylene glycol.
[b]PEG-DM represents polyethylene glycol-dimethacrylate 400.

TABLE IV

| Example | Water Wettability (sec) | Water Flow Rate at 10 psi (mL/Min/cm$^2$) | Water-Isopropanol Bubble Point (psi) | Burst Strength (psi) |
|---|---|---|---|---|
| 10 | Hydrophobic | 15.6* | 18 | 13 |
| 11 | Hydrophobic | 14.9* | 18 | 13 |
| 12 | 30 | 13.7 | 18 | 15 |
| 13 | Instant | 13.2 | 19 | 20 |
| 14 | Instant | 14.2 | 19 | 22 |
| Control | Hydrophobic | 16.0* | 18 | 13 |

*This hydrophobic polypropylene membrane was pre-wetted in ethanol prior to test for water flow rate.

EXAMPLE 15-20

A microporous (0.2 μm) hydrophobic polypropylene membrane was treated with photografting solutions containing 14% polyethylene glycol-dimethacrylate (Mw=400), 1% Darocur 1173, 25% acetone, and 60% ethylene glycol or a substitute using the methods described in Example 1-8. The results of membrane wettability for each after UV treatment are presented in Table V.

TABLE V

| Example | Ethylene Glycol or Substitute | Water Wettability of Treated Membrane (sec) |
|---|---|---|
| 15 | Ethylene glycol | Instant |
| 16 | 2-Methoxy ethanol | Hydrophobic |
| 17 | 2-Ethoxy ethanol | Hydrophobic |
| 18 | Ethylene glycol diacetate | Hydrophobic |
| 19 | Propylene glycol | >100 |
| 20 | Polyethylene glycol | Hydrophobic |

EXAMPLE 21-24

The 0.2 μm hydrophobic polypropylene membranes of Examples 15-20 were treated with photografting solutions comprising 12% polyethylene glycol-dimethacrylate (Mw=400), Darocur 1173, 62% ethylene glycol, and 25% acetone substitute in the same manner as described in Example 1-8. The results of membrane wettability after such treatment follow in Table VI.

TABLE VI

| Example | Acetone Substitute | Water Wettability of Treated Membrane (sec) |
|---|---|---|
| 21 | Methanol | 1 |
| 22 | Ethanol | Hydrophobic |
| 23 | n-Propanol | Hydrophobic |
| 24 | Isopropanol | Hydrophobic |

EXAMPLE 25-30

The 0.2 μm hydrophobic polypropylene membranes were post-treated with photografting solutions containing 62% ethylene glycol, 25% acetone, 1% Darocur 1173, and 12% polymerizable monomer in the manner similar to that described in Examples 1-8. The results of membrane wettability after UV treatment are outlined in Table VII.

TABLE VII

| Example | Monomer Substitute | Water Wettability of Treated Membrane (sec) |
|---|---|---|
| 25 | Acrylamide | Hydrophobic |
| 26 | 4-Vinyl pyrridine | Hydrophobic |
| 27 | N-Vinyl pyrrolidone | Hydrophobic |
| 28 | Methyl methacrylic acid | Hydrophobic |
| 29 | Acrylic acid | Hydrophobic |
| 30 | 2-Hydroxyethyl methacrylate/ tetraethylene glycol-diacrylate* | Hydrophobic |

*85/15 weight ratio was used for the monomer composition.

EXAMPLE 31

A 0.2 μm hydrophobic polypropylene membrane was treated as in Examples 1-8 with a photografting solution containing 0.5% Darocur 1173, 14% polyethylene glycoldimethacrylate (Mw=400), and 85.5% methanol. The thus treated membrane was completely hydrophobic.

EXAMPLE 32

A 0.2 μm hydrophobic polypropylene membrane was treated with a photografting solution containing 14% acrylic acid, 1% Darocur 1173, and 85% acetone using the UV process as described in Examples 1-8. The thus treated membrane was completely hydrophobic.

EXAMPLE 33

A 0.2 μm hydrophobic polypropylene membrane was treated with a photografting solution comprising 1% Darocur 1173, 14% polyethylene glycol-dimethacrylate (molecular weight=1000, available from Polysciences, Inc., Warrington, Pa.), 60% ethylene glycol, and 25% acetone under conditions as described in Examples 1-8. The thus treated membrane was instantly water wettable.

EXAMPLE 34-38

A 0.45 μm hydrophobic polyvinylidene difluoride membrane (membranes available as BioTrace PVDF® membrane from Gelman Sciences Inc., Ann Arbor, Mich.) were dehydrofluorinated in an alkali solution containing 25% potassium hydroxide, 30% ethanol, and 45% deionized water for 45 seconds at 57° C. After dehydrofluorination, the membranes were immediately washed with copious water, and dried at 60° C. for 20 minutes.

The dehydrofluorinated membranes were treated by UV irradiation in a manner similar to that used for the hydrophobic polypropylene membranes in Examples 1-8 but each with a different photografting solution whose composition is shown in Table VIII.

TABLE VIII

| Example | EG[a] (%) | PEG-DM[b] (%) | Darocur 1173 (%) | Acetone (%) | Water (%) |
|---|---|---|---|---|---|
| 34 | 40 | 15 | 2 | 17 | 26 |
| 35 | 40 | 11 | 2 | 17 | 30 |
| 36 | 40 | 11 | 1 | 17 | 31 |
| 37 | 40 | 11 | 4 | 17 | 28 |
| 38 | 0 | 11 | 2 | 47 | 40 |

[a]EG represents ethylene glycol.
[b]PEG-DM represents polyethylene glycol-dimethacrylate 400.

The treated membranes were analyzed for water wettability, water flow rate, water bubble point, and burst strength. The results are shown in Table IX.

TABLE IX

| Example | Water Wettability (sec) | Water Flow Rate at 10 psi (mL/Min/cm$^2$) | Water Bubble Point (psi) | Burst Strength (psi) |
|---|---|---|---|---|
| 34 | 1 | 14 | 35 | 33 |
| 35 | 1 | 13 | 38 | 32 |
| 36 | 1 | 14 | 36 | 33 |
| 37 | 1 | 14 | — | 32 |
| 38 | Hydrophobic | 15[b] | 28[c] | 18 |
| Control[a] | Hydrophobic | 15[b] | 28[c] | 18 |

[a]A dehydrofluorinated membrane was used as control.
[b]This membrane was pre-wetted in ethanol prior to the water flow rate testing.
[c]This membrane was pre-wetted in ethanol before water bubble point testing.

The results show that the untreated (control) membrane and the membrane treated with the solution containing no ethylene glycol are both hydrophobic and have low burst strength.

EXAMPLE 39

The UV-treated hydrophilic polypropylene membrane prepared in Example 1 and its hydrophobic precursor were characterized for protein binding capacity using a radio-label assay as follows:

1. The hydrophilic polypropylene membrane disc (13-mm) was equilibrated with 20 mM PBS for a few minutes, and then a 15-μL $^{125}$I/rabbit IgG solution of PBS (892 cpm/μL, total protein concentration: 1 μg/μL) was spotted onto the membrane. For the hydrophobic precursor, the precursor membrane disc (13-mm) was prewetted with methanol and then equilibrated with 20 mM PBS for the same period of time as for the hydrophilic sample. Then a 15-μL $^{125}$I/rabbit IgG solution was spotted onto the membrane precursor disc.
2. Both membrane discs were incubated at ambient temperature for 30 minutes.
3. After incubation, the membrane discs were first soaked in 10 mL PBS solution separately, and then flushed with 2×10 mL PBS solution.
4. The washed membrane discs were finally counted for radioactivity using a scintillation counter. The protein binding capacity of these two types of membrane is listed in Table X.

TABLE X

| Sample | % Protein Bound |
|---|---|
| Hydrophilic polypropylene membrane | 12 |
| Hydrophobic polypropylene membrane | 73 |

The embodiments of the invention in which an exclusive property or privilege is claimed are defined as follows:

We claim:

1. A composite microporous membrane structure comprising:

a hydrophobic polyolefin microporous precursor membrane having external surfaces and having pores with internal pore surfaces; and a water soluble hydrophilic polymer comprising polyethylene glycol diacrylate co-extensively applied to said surfaces in a thin liquid coating that is permanently photografted in solid state form onto the internal pore surfaces of the precursor membrane so that the thus grafted membrane structure is hydrophilic, essentially retains the same microporosity as the precursor membrane and is water wettable, and non-leachable.

2. The membrane structure of claim 1 wherein the hydrophilic polymer comprises polyethylene glycol dimethacrylate.

3. The membrane structure of claim 1 wherein the hydrophilic polymer comprises polyethylene glycol di(lower alkyl)acrylate.

4. The membrane structure of claim 1 wherein the polyolefin precursor membrane is a polypropylene membrane.

5. The membrane structure of claim 1 wherein the polyolefin precursor membrane is a partially fluorinated polyolefin membrane.

6. The membrane structure of claim 1 wherein the polyolefin precursor membrane is a polyvinylidene difluoride membrane.

7. A method of making a hydrophilic microporous membrane comprising:

forming a composite porous membrane formed from a microporous hydrophobic membrane substrate having external surfaces and pores with internal pore surfaces formed of a first polymer comprising polyolefin, said substrate being directly coated over its entire surfaces with a second polymer comprising polyethylene glycol-dialkylacrylate, said composite porous membrane having essentially the same porous configuration as said porous membrane substrate;

by contacting said porous membrane substrate with a photografting solution of said second polymer and a photoinitiator in ethylene glycol, and exposing said second polymer to radiation ray treatment to graft said second polymer in situ over the entire surfaces of said substrate under conditions such that the thus grafted membrane is hydrophilic, essentially retains the same microporosity as the membrane substrate and is water wettable and non-leachable, while avoiding plugging of said pores.

8. A method according to claim 7 where the precursor membrane substrate is formed of polypropylene.

9. A method according to claim 7 where the second polymer comprises polyethylene glycol dimethacrylate.

10. A method according to claim 7 where said photografting solution comprises polyethylene glycol dimethacrylate, a photoinitiator, a low surface tension liquid, and ethylene glycol.

11. A method according to claim 10 where the photoinitiator comprises a hydroxyalkylphenone having the formula

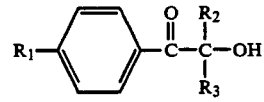

where $R_1$ represents hydrogen, or a $C_{1-4}$ alkyl or alkoxy group or halogen, and $R_2$ and $R_3$ independently represent $C_{1-4}$ alkyl or alkoxy groups.

12. A method according to claim 7 wherein the amount of water soluble polymer concentration in the solution is such that the resulting grafted membrane structure retains microporosity and is readily wettable in water and is non-leachable.

13. A method according to claim 7 wherein the radiation ray treatment comprises:

wetting the hydrophobic membrane substrate completely in the photografting solution;

removing excess solution from the thus wetted membrane substrate, and exposing the resulting residually wet membrane in a UV chamber under inert gas for about 10 to about 50 seconds at a UV intensity of about 140 mW/cm$^2$ to graft the polyethylene glycol dialkylacrylate to the membrane substrate.

14. A method according to claim 13 comprising:

soaking the thus grafted membrane substrate in a water soluble solvent for a time sufficient to remove photografting contaminants from the membrane substrate; and washing the thus soaked membrane substrate with water and drying the washed substrate.

* * * * *

UNITED STATES PATENT AND TRADEMARK OFFICE
CERTIFICATE OF CORRECTION

PATENT NO. : 5,209,849
DATED     : 5-11-93
INVENTOR(S) : Hu et al

It is certified that error appears in the above-identified patent and that said Letters Patent is hereby corrected as shown below:

Column 2, line 54, delete "Precursor" and insert --precursor--

Column 4, line 32, delete "Uv" and insert --UV--;

Column 5, line 1, delete "Uv" and insert --UV--;

Column 5, line 15, delete "Uv" and insert --UV--;

Column 5, line 36, delete "Uv" and insert --UV--;

Column 7, line 66, delete "Uv" and insert --UV--;

Column 8, line 55, delete "Darocur 1173" and insert --1% Darocur 1173--.

Signed and Sealed this

Twenty-fifth Day of January, 1994

Attest:

BRUCE LEHMAN

*Attesting Officer*    *Commissioner of Patents and Trademarks*